United States Patent [19]
Williams et al.

[11] 4,339,752
[45] Jul. 13, 1982

[54] SYNTHETIC ARRAY PROCESSOR

[75] Inventors: Frederick C. Williams, Topanga; William W. Clements, Los Angeles, both of Calif.

[73] Assignee: Hughes Aircraft Company, Culver City, Calif.

[21] Appl. No.: 154,238

[22] Filed: Jun. 15, 1971

[51] Int. Cl.³ .............................................. G01S 13/90
[52] U.S. Cl. .................................................. 343/5 CM
[58] Field of Search ...................................... 343/5 CM

[56] References Cited
U.S. PATENT DOCUMENTS
3,333,267  7/1967  Williams ........................... 343/5 CM Primary Examiner—Malcolm F. Hubler
Attorney, Agent, or Firm—Lawrence V. Link, Jr.; Leonard A. Alkov; William J. Bethurum

[57] ABSTRACT

A synthetic array processor wherein radar data, received from an area to be mapped during a plurality of subarray flight path segments, is electronically focused in parallel processing channels to form a series of approximately rectangularly shaped low azimuth resolution maps; and signals associated with corresponding portions of each low resolution map are further processed by means of digital filtering techniques to provide, in a format readily adapted for display, a high azimuth resolution map.

21 Claims, 12 Drawing Figures

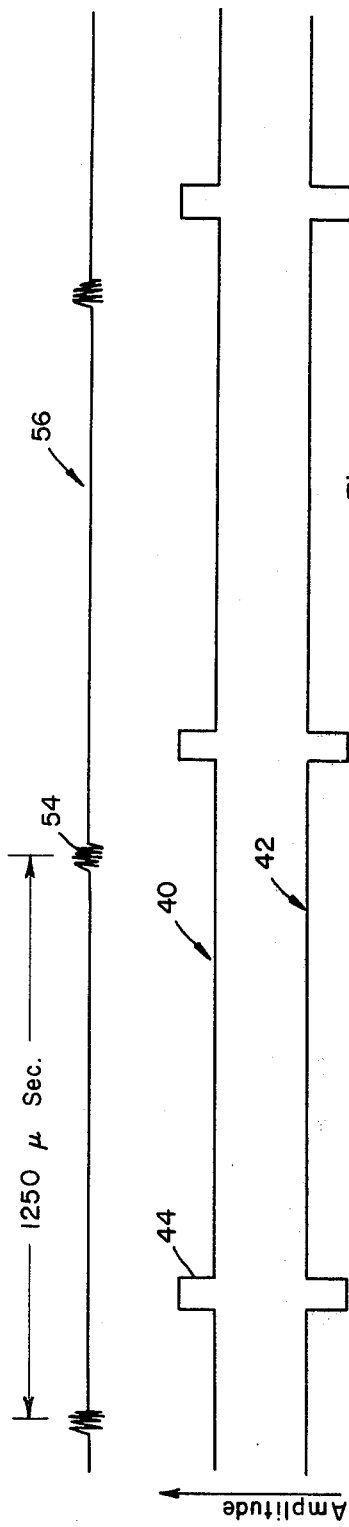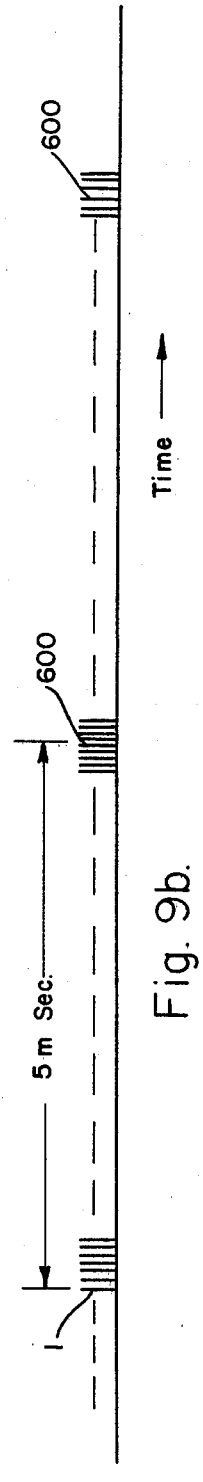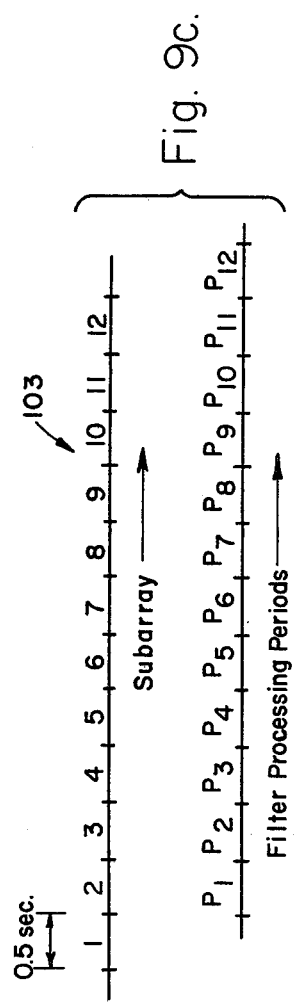

SYNTHETIC ARRAY PROCESSOR

BACKGROUND OF THE INVENTION

This invention relates generally to synthetic array mapping processors, and more particularly to a radar telescope for providing high resolution imagery of relatively large areas at short ranges.

In synthetic array mapping, radar data received from selected range resolution elements within an illuminating beam is periodically sampled as the antenna is moved along a flight path. This data is then electronically focused to simulate the physical focus (narrow azimuth beam width) of an antenna having a length approximately equal to the flight path segment over which the synthetic array was formed. Basically, the electronic focusing involves amplitude weighting and phase adjustment of a sequence of range gated radar returns to cause the returns from a particular path of ground to be accentuated while those from other contiguous ground patches are attenuated. Due to aircraft motion during the time required to collect the data, a phase history is impressed on the returns from each target; and for these returns to add in phase requires that phase compensation be applied thereto.

One processing technique, sometimes referred to as "batch" processing, applies a phase adjustment which "tracks out" the doppler frequency of the center point of the map area. Filter banks, responsive to the doppler frequency differential across the target area, are then utilized to provide signals indicative of the radar reflectivity characteristics of the mapped area.

Another processing technique, sometimes referred to as "line-by-line" processing, accomplishes the required phase correction by applying the proper phase adjustments to a sequence of range gated radar returns so that they focus on a particular ground point. The sequence is then advanced one range resolution element across the aircraft track (range dimension) and the proper phase adjustments reapplied. This process is repeated until all range elements across the swath have been operated upon, at which time the sequence starts back at the first range element and advances one azimuth element along the aircraft track (azimuth dimension). In some applications parallel processing channels are used so that the different azimuth elements are processed simultaneously for each range interval.

A significant advantage of "batch" processing is that it is particularly well adapted to digital implementations; and with innovations such as the Fast Fourier Transforms techniques (sometimes referred to as the "Cooley-Tukey algorithm") the number of mathematical operations required to generate a block of N azimuth resolution elements is reduced from $N^2$ for line-by-line processing to $2N \log_2 N$ for the batch processing technique. Batch processors have, however, several disadvantages—particularly for reconnaissance applications. One of these is related to the geometry of batch processing inasmuch as for reasonably simple mechanizations, the angular and not the azimuth resolution is constant across a block of data. For this reason the block of data tends to have a keystone shape which makes it very difficult to generate a composite map by fitting separate blocks together; and the additional display processing caused thereby increases the complexity of "batch" type processor systems.

SUMMARY OF THE INVENTION

A primary object of the subject invention is to provide an improved method and apparatus for processing, with a reduction in the number of required arithmetic operations, radar data to yield high resolution synthetic array imagery.

Another object is to provide a synthetic array mapping system which is practical to implement for high resolution applications; which provides imagery in a format readily adapted for display; and which minimizes alignment problems between adjacent subsections of the map.

A further object is to provide a radar telescope mechanism which makes practical from an equipment complexity standpoint, high resolution mapping of a relatively large area at short ranges.

Yet another object is to provide a radar telescope which allows high resolution mapping of relatively large areas at short ranges and over a wide range of "look angles", and which avoids display registration problems.

In accordance with the subject invention, the display flexibility of "line-by-line" processing is combined with the reduction in equipment complexity feature of "batch" processing. These advantages are realized by a novel technique wherein low azimuth resolution maps of a selected area are formed by line-by-line processing the received data from each of a plurality of subarrays; and then processing signals from corresponding portions of each low azimuth resolution map by means of further digital filtering techniques to provide a high resolution map therefrom. The method and apparatus in accordance with the subject invention provide map shape flexibility as a result of the approximately rectangular layout of the low resolution maps formed by the line-by-line processing technique. The keystone inaccuracies associated with batch processing are minimized, as they apply only within the relatively small resolution blocks formed by the line-by-line processing, instead of to the whole map. Overall system efficiency results from the fact the maximum rate of arithmetic operations is determined primarily by the reduction from coarse resolution to fine resolution, and in accordance with the invention this step may utilize the more efficient spectrum analysis techniques, such as the Fast Fourier Transform algorithm, for example.

BRIEF DESCRIPTION OF THE DRAWINGS

The novel features of this invention, as well as the invention itself, will be better understood from the following description taken in conjunction with the accompanying drawings in which like reference characters refer to like or similar parts and in which:

FIGS. 9a, 9b and 9c are timing diagrams helpful for explaining the operation of the processor of FIGS. 6 and 7.

DESCRIPTION OF THE PREFERRED EMBODIMENT

Figure 1:
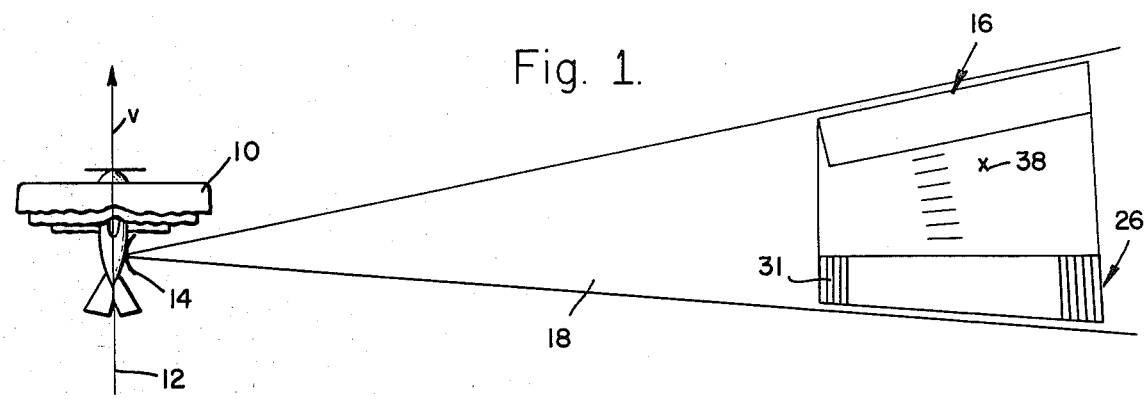
FIGS. 1, 1a, 2 and 3 illustrate the flight path—terrain relationship of the data processed by one preferred embodiment of the subject invention, operating in a radar telescope mode.

As shown in FIG. 1, an aircraft 10 is assumed to fly a straight line flight path 12, and an antenna 14 illuminates a section of terrain which includes an area 16 to be mapped. Received signals reflected from discrete scatterers within the real antenna beam 18 are periodically sampled at range intervals corresponding to area 16. The synthetic array processor in accordance with the subject invention, electronically focuses the received radar data to simulate the physical focus (narrow azimuth beam width) of an antenna which approaches the length of the flight path over which the synthetic array is formed.

Figure 2:
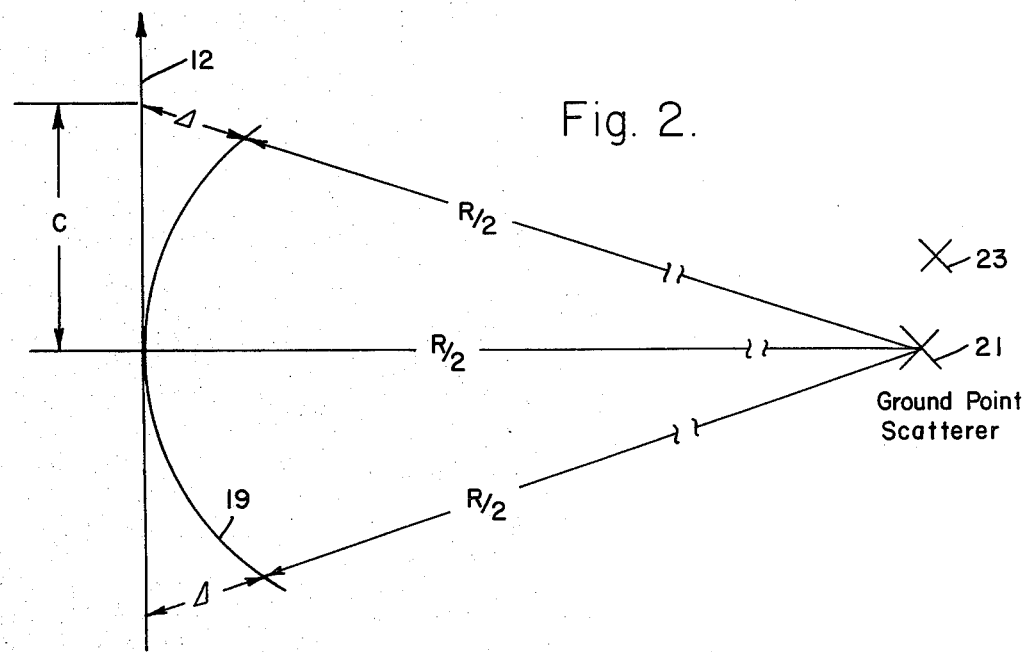

The required phase corrections associated with the data forming a synthetic array compensate for two-way range (R) variations, such as illustrated in FIG. 2. These range variations include a quadratic term approximately equal to twice the distance between straight-line flight path 12, and a theoretical semicircular constant range path (arc) 19 centered on a given ground point scatterer 21. The magnitude of the Δs shown in FIG. 2 depicts the one-way range variation and have been exaggerated to better illustrate the variation over the array length. For a given point along the flight path, the required phase correction (in radians) resulting from the two-way path length variation is Φ where:

$$\phi = \frac{2\pi}{\lambda} \cdot 2\Delta = \frac{4\pi\Delta}{\lambda};$$

where λ is the radiated wavelength. For purposes of explanation, Δ may be approximated as $\Delta = C^2/2R$; where C is the distance along the flight path measured relative to the array center and R is the range to a given point scatterer when the illuminating beam is broadside thereto. A different point scatterer displaced in azimuth, such as point 23, would have a constant range semicircular path (not shown) slightly displaced from arc 19; and hence the required phase corrections would be slightly different.

Hereinafter were discussed two techniques for applying the proper phase correction to the received radar data, i.e. the "line-by-line" and the "batch" processing techniques. A significant aspect of the subject invention is the method whereby the advantages of each of these two techniques are realized while their respective limitations are minimized.

Figure 1A:
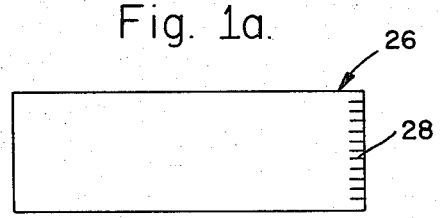
Figure 3:
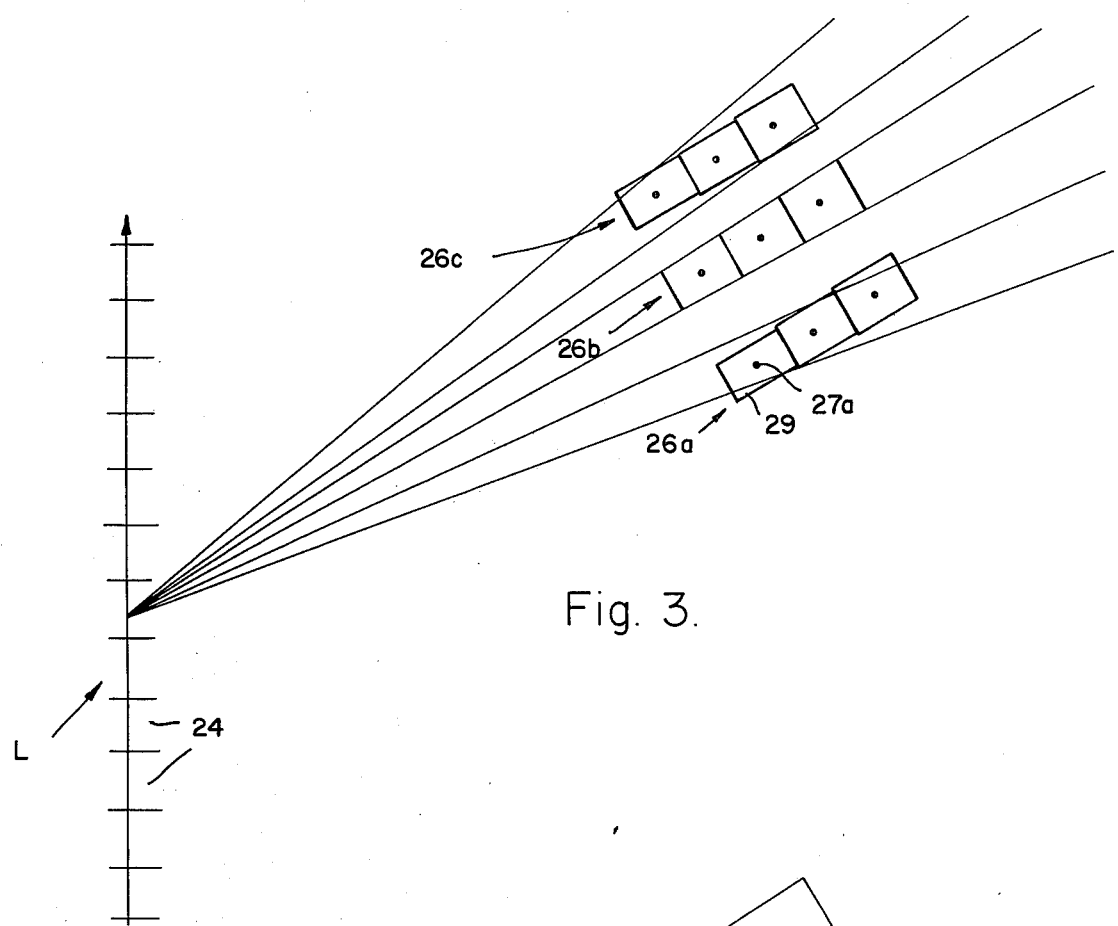

In the interest of clarity, a relatively simple example for the radar telescope mode of operation of the subject invention has been illustrated in FIGS. 1, 1a and 3. The area 16 (FIG. 1) to be mapped encompasses a square 3,000 feet on a side and the total array length (L) in FIG. 3 is composed of 12 subarrays, indicated by reference numeral 24—each of length L/12. Data gathered along each subarray is processed by a line-by-line technique to form a low azimuth resolution map for each subarray. For example, the map of FIG. 1 could comprise 48 blocks, such as 26, with each block having a 60 foot azimuth resolution and containing 600 (5 feet resolution) cells in the range dimension, such as cell 31. One such low resolution map is formed for each subarray, such as 24 of FIG. 3. For the selected example, twelve maps are formed in a time sequence to provide twelve angle diversity coherent "looks" at the target area. The resultant data for corresponding points from each of the low resolution maps (corresponding azimuth block and range cell) are processed to form twelve, 5 foot azimuth resolution cells, such as cell 28 of FIG. 1a, for each of the blocks.

FIG. 3 depicts three of the 48 low azimuth resolution blocks, sometimes hereinafter referred to as columns of resolution blocks, 26a, 26b and 26c in greater detail. Each of these low azimuth resolution blocks are further broken down into a plurality of subblocks in the range dimension. The significance of the range dimension subgrouping is related to the phase variation of the received signals as a function of the swath width (across track dimension). In high resolution mapping applications compensation for this phenomena must be applied at periodic range intervals defined by the allowable defocusing effect assigned to this error contributor. Such range intervals are sometimes referred to as the system's "depth of focus", which for example could be 500 feet. It can be shown that adequate focusing is obtained a distance $Z = 2d^2/\lambda$ away from the range of best focus. For d=5 ft., λ=0.1 ft. The depth of focus 2Z=1000 ft. In the illustrated embodiment the length of the range subblocks are selected to be approximately equal to the system's depth of focus. For the mapping situation of FIG. 1, there would be six such 500 foot range subblocks in each azimuth resolution block. Only three such range subblocks are shown for each azimuth block in FIG. 3 to preserve the clarity of the drawing.

As will be explained in detail hereinafter, the phase center 27 of each of the subblocks are controlled to lie along parallel lines so that the total area covered by the subblocks approximates a square, not a keystone. Also the azimuth pointing direction of the individual subblocks is programmed as a function of the position of the aircraft along the array. Hence, the loq azimuth resolution maps may be formed such that the 48 azimuth by 6 range subblocks form a square 3,000 feet on a side with little distortion.

MECHANIZATION

Figure 4:
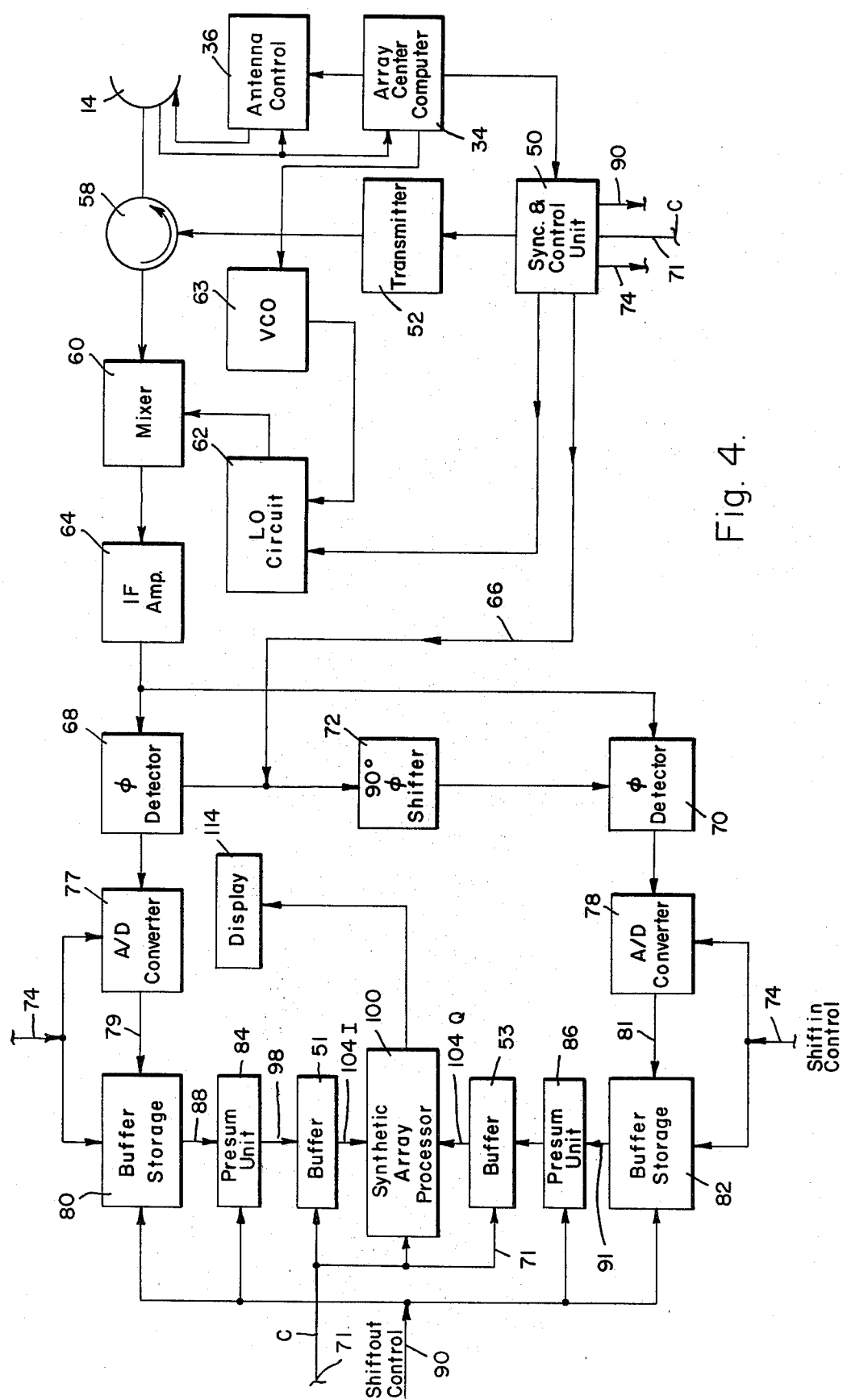
FIG. 4 is a block diagram of a radar mapping system which includes a synthetic array processor in accordance with the subject invention.

Referring now primarily to FIG. 4, a synchronization and control unit 50 applies synchronizing pulses to a conventional coherent pulse transmitter 52 which in response thereto provides coherent output pulses of RF energy 54 (see waveform 56 of FIG. 9a). Synchronization and control devices suitable for unit 50 are well known in the art and may be mechanized, for example, by a high frequency stable master oscillator and associated circuitry (not shown) for multiplying the oscillator's frequency to provide RF signals required by transmitter 52 and local oscillator unit 62. Additionally the unit 50 may include circuitry for counting down the frequency of the master oscillator to the pulse repetition frequency (PRF); and circuitry for producing range gate pulses in response to control signals from an array center computer 34.

The RF output pulses from transmitter 52 are applied through a duplexer 58 to antenna 14 from whence they are radiated as illuminating beam 18 (FIG. 1). Antenna 14 is positioned in response to antenna control unit 36, which in turn is controlled by computer 34, such that the illuminating beam 18 is centered on the area to be mapped.

The reflected energy received from scatterers within antenna pattern 18 is applied from antenna 14 through duplexer 58 to mixer 60. The RF reference signal applied from L.O. unit 62 varies as a function of the relative position of the aircraft so as to maintain the relative phase of the signal received from the center of the mapped area constant—i.e., the doppler frequency of the center of the beam is "tracked out". The tracking of the phase history of the center of the beam may be performed by several techniques one of which is illustrated in FIG. 4. As there shown, computer 34 computes the doppler frequency of the beam center from the flight geometry and antenna coordinates; and controls a voltage controlled oscillator 63 such that the frequency of the signal from the beam center is maintained constant at the output of mixer 60. L.O. unit 62 may, for example, comprise a mixer (not shown) for forming the signal $(f_c - 30 \text{ Mhz}) + f_t$ where: $(f_c - 30 \text{ Mhz})$ is the transmitted frequency less the IF frequency, applied from unit 50; and $f_t$ is the doppler frequency at the center of the beam, applied from voltage controlled oscillator 63. Also, computer 34 computes the minimum and maximum ranges, on each range sweep (PRF interval), which encompass the area to be mapped—i.e. the range intervals of area 16 of FIG. 1. The implementation of the function described hereinabove for computer 34 is shown in greater detail in co-pending application Ser. No. 736,928, filed June 4, 1969 by Frederick C. Williams and assigned to the assignee of the subject application. These maximum/minimum range values are applied to synchronization and control unit 50 which in turn provides range gate signals ("shift in" control signals) on an output lead 74, and "shift out" control signals on an output lead 90. The relative timing of the "shift in" and "shift out" control signals for several PRF intervals are shown in waveforms 40 and 42, respectively, of FIG. 9a. The change in the range of gating signals 44 during the adjacent PRF intervals have been exaggerated to illustrate the point that the relative range of these signals is programmed by computer 34 so that data from the area to be mapped is sampled as the aircraft moves along the array path.

The output signals from mixers 60 phase compensated to the center of the array are applied to, and amplified by, an IF amplifier 64; and are then phase detected in a phase detector 68 against an IF reference signal applied on a lead 66. The IF reference signal is also produced by synchronization and control unit 50 as a function of the basic frequency reference of the system. If the input signal to detector 68 is represented by a vector of amplifier A with a phase B relative to the phase of reference signal 66 (arbitrarily established as a phase standard), then the output signal therefrom may be represented by the quantity A cos B which is sometimes hereinafter designated "I" for in-phase video.

Similarly, the signal from amplifier 64 is also applied to a quadrature phase detector 70; and the signal 66, after being phased shifted 90 degrees by a phase shifter 72, is applied as the reference thereto. Hence, the output signal of phase detector 70 is translated 90 degrees from that of detector 68 and may be represented by the quantity A sin B—which quantity is sometimes hereinafter designated "Q" for quadrature video.

As mentioned above, the range interval to be mapped is determined by the "shift-in-control" signal applied on lead 74 from synchronization and control unit 50. These pulses are applied to and control the sampling operation of analog to digital (A/D) converters 77 and 78, as well as the operation of buffer storage units 80 and 82. The minimum/maximum range gates may be mechanized by a counter (not shown) which controls a flip-flop circuit (not shown) such that the flip-flop is set when the counter counts a number of master oscillator pulses, as determined by computer 34, corresponding to the start of the mapped area. The flip-flop is reset when a second count, also determined by computer 34, corresponding to the end of the mapped area has been reached. The shift-in-control signal may then be formed by combining the minimum/maximum range gate signal with sampling clock pulses. The repetition frequency of the clock pulses is determined by the desired range resolution, i.e., the length of the individual range zones or segments to be processed, (5 feet in the illustrated embodiment). Upon the application of the shift-in-control signals analog-to-digital converter units 77 and 78 sample the inphase and quadrature video signals applied from detectors 68 and 70 respectively. Units 77 and 78 convert the video signals to digital words of the desired precision, e.g. each word could comprise 8 bits including a sign bit.

The digital words representative of the value of the inphase and quadrature signals are applied from the converter units on composite leads 79 and 81 to buffer storage units 80 and 82, respectively. Relative to FIG. 4, the term "composite lead" means that, although a separate lead for each data bit is utilized, for the sake of clarity of the drawing only one lead per data channel is shown. It will be understood that in the discussion of the digital circuits hereinafter presented that composite leads are employed where appropriate. It should also be noted that, by appropriate data reformatting, the parallel bit readout could be converted into a high speed serial bit readout so that only one wire could be utilized. However, such high speeds are rarely practical in high resolution processors.

The inphase and quadrature binary data words are shifted out of the buffer units 80 and 82 to presum units 84 and 86 on composite leads 88 and 91 respectively. The buffer and presum units are controlled in response to "shift out" control signals (waveform 42 of FIG. 9a) applied on a lead 90 from the synchronization and control unit 50.

Figure 5:
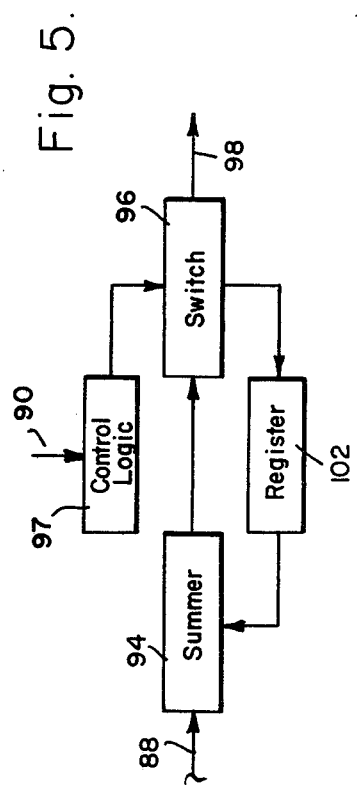
FIG. 5 is a block diagram of a presum unit suitable for incorporation into the system of FIG. 4.

A mechanization suitable for presum units 84 and 86 is shown in FIG. 5 and will be explained relative to unit 84. The digital data words are shifted out of buffer storage unit 80 on lead 88 and are applied to a first input circuit of a summer 94, the output circuit of which is coupled to a switch 96. The switch 96 has a first output circuit coupled on a lead 98 to a second buffer storage unit 51 and a second output circuit coupled to a presum register 102. The output signal of presum register 102 is applied to the second input circuit of summer 94.

The operation of units 84 and 86 may be explained in terms of the example of FIG. 3, and arbitrarily selected system parameters. For a PRF of 800, a range resolution of 5 feet and a presum ratio of 4 to 1,600 range samples are fed to buffer units 80 and 82 in 6.1 $\mu$sec., every 1/800 of a sec. The buffer units 80 and 82 will read out the stored samples during the interpulse period (1250-6.1 $\mu$sec.) in response to the shift out control signals. The presum ratio is chosen so that approximately one sequence of 600 output pulses enters the processor 100 each d feet of aircraft travel. For an azimuth resolution of d=5 feet and an aircraft speed of 900 ft./sec., a presum ratio of about 4 to 1 is appropriate. For this presum ratio the switch 96 (FIG. 5) connects the output of the summer 94 to the 600 word presum register 102 for three consecutive transmission pulse intervals; and connects the summer output circuit to the input of second buffer unit 51 during the fourth interpulse interval. This sequence is repeated every four transmission periods. Hence, the data from buffer units 80 and 82 is read into buffer units 51 and 53, respectively, at a rate equal to one-fourth the transmission repetition frequency. Hence, the function performed by the presummers is to process the received data to provide the unfocused sum of a number of consecutive returns associated with each range interval, so as to reduce the processing rate required by processor 100.

Buffer units 51 and 53 receive the bursts (600 words per burst) of data (inphase and quadrature) during a 1250 μsec. interval every 5 milliseconds and applies this data on leads 104I and 104Q, respectively, to the 48 channels (FIG. 6) of processor 100 at a uniform rate over the 5 millisecond interval (see FIG. 9b). Buffer units 51 and 53 are controlled by processor clock pulses, synchronized to the system of FIG. 4, applied on lead 71 from synchronization and control unit 50.

Figure 6:
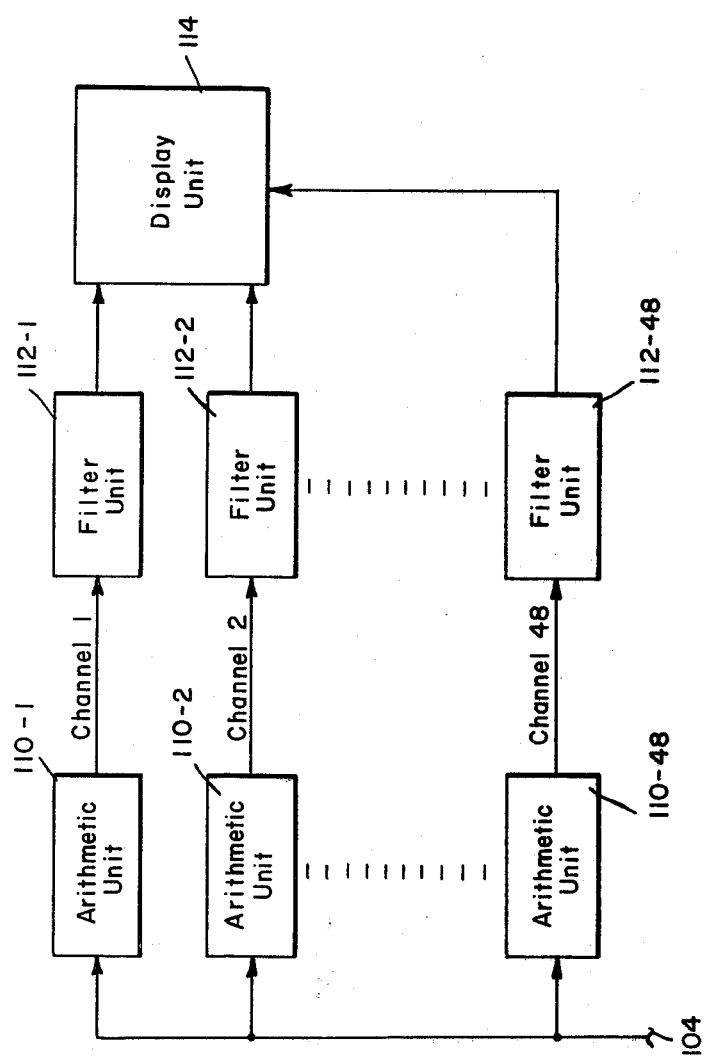
FIG. 6 is a block diagram of one preferred embodiment of a synthetic array processor in accordance with the subject invention.

One preferred embodiment of processor 100 is shown in a simplified block diagram form in FIG. 6 as comprising 48 parallel processing channels. Each channel includes an arithmetic unit 110 and a filter unit 112. In FIG. 6, the arithmetic and filter units associated with channel one are designated 110-1 and 112-1, respectively; and the elements of the other channels are correspondingly assigned a channel identification number following the element reference numeral. The operation and mechanization of each of the processing channels are identical, with each channel providing output signals to display unit 114. The output signals from each of the channels define the high azimuth resolution characteristics of one azimuth block 26 (FIG. 1). Considering channel one, for example, during each one of the 12 subarray flight segments (see waveform 103 of FIG. 9c), 100 presum input data bursts of 600 words (range cells) per burst at a repetition rate of 200 bursts per second are applied thereto, in parallel with the other 47 processing channels. It is recalled that the presum input video signals have been range and phase corrected to the center 38 of mapped area 16 by the shift in control signals and the local oscillator reference signals, respectively, under the control of computer 34 (FIG. 4). Unit 110 provides the necessary range correction to cause the center of the subblocks, such as 27a shown in FIG. 3, to lie on straight lines rather than on a cord of a constant range circle. Since the input data is range correlated to the center of the map area, only one range correction is required by unit 110 for each channel, for each of the subarray segments.

Unit 110 also applies the appropriate phase correction to each input data word (range cell); and accumulates the phase corrected signals for each range cell during subsequent input signal bursts of each subarray to provide focused output signals for each of the range cells sometimes hereinafter referred to as resolution cells. These output signals represent the value of the signals received during the subarray period from each range bin focused on the center of the corresponding 60 foot azimuth resolution block (26 of FIG. 1). Hence, in the disclosed embodiment during each subarray period units 110 of the 48 parallel processing channels provide focused output signals for 48 columns of resolution cells in the azimuth dimension, and 600 rolls of resolution cells in the range dimension; and as is explained above and as shown in FIG. 3, these resolution cells are substantially, rectangularly oriented. At the end of each subarray time period 600 output words from each azimuth processing channel, sometimes hereinafter collectively referred to as a set of imagery data, are provided from arithmetic unit 110 and applied to filter unit 112. Each of these words are indicative of the characteristics of a mapped area 60 feet in azimuth and 5 feet in range resolution. Filter unit 112 stores, processes, and stores the residues of the processed signals from corresponding resolution cells (same azimuth and range location) from each low resolution maps sequentially formed during each of the 12 subarrays. At the end of the total array (subarray number 12 having been completed) the filter bank 112 provides output signals defining the high resolution map—such as resolution elements 28 of FIG. 1a. Each of the 48 processing channels provide 12 output signals, sometimes hereinafter collectively referred to as a subset of high resolution synthetic array imagery data, for each of the 600 range resolution cells. Hence, 48×12×600 output signals indicative of the map characteristics of the illuminated ground area are provided to display unit 114. Unit 114 displays the mapped area with 5 foot resolution in both range and azimuth and without noticeable "keystone" problems.

Figure 7:
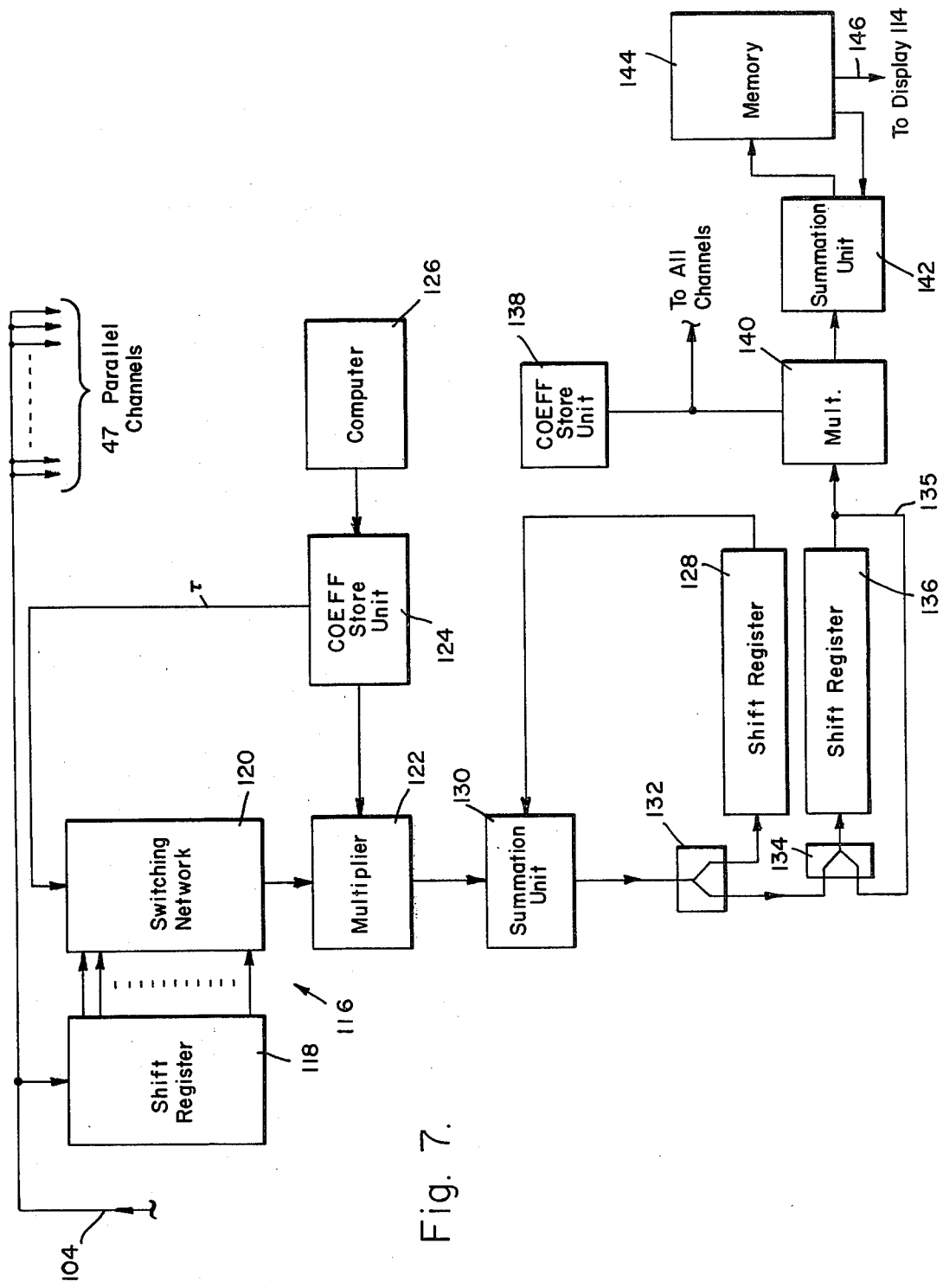
FIG. 7 is a more detailed block diagram of one channel of the processor of FIG. 6.

One of the processing channels of FIG. 6 is shown in greater detail in FIG. 7. As there shown, the input data to the processor 100 (inphase and quadrature) is applied on composite lead 104 to an interpolator 116, sometimes hereinafter referred to as delay means, which comprises a shift register 118 and a switching network 120. Shift register 118 may, for example, be eight words in length. Switching network 120 includes the necessary switching and logic circuits for coupling a selected one of the output taps of the shift register to a multiplicand input terminal of a complex multiplier unit 122, in response to a digital code applied to the switching network from a coefficient storage unit 124. Interpolator 116 provides the necessary range corrections, sometimes hereinafter referred to as "relative time delay," for each of the 12 subarrays to place the center of each subblock (FIG. 3) on a straight line rather than on a circle of constant range. Therefore, 12 values of range coefficients ($\tau$) must be stored in the coefficient storage unit 124. These values may be computed by a computer 126 from parameters of the flight geometry supplied from auxiliary systems (not shown) and/or from information manually entered into computer 126. It is noted that both the inphase and quadrature components of the signals are processed by unit 100, although only a single processing path is shown in FIGS. 6 and 7 in order to maintain the clarity of the drawings. It is understood that all digital units are appropriate complex devices for performing the indicated operations on the inphase and quadrature signal components. For example, where the data words applied through switching network 120 are designated x and the desired coefficient multipliers by the complex number A, the complex multiplication Ax applies the appropriate phase correction and amplitude scaling of the input data signals to provide the desired focusing and "sidelobe" levels of the synthetic subarray. This complex multiplication function may be more clearly visualized by recalling that the product of two complex numbers, $A_I + jA_Q$ and $D_I + j D_Q$, is $(A_I D_I - A_Q D_Q) + j(A_Q D_I + D_I A_Q)$ where $D_I$ and $D_Q$ are the inphase and quadrature component terms of the data words and $A_I$ and $A_Q$ are the inphase and quadrature terms of the complex multipliers. $(A_I D_I - A_Q D_Q)$ and $(A_Q D_I + A_I D_Q)$ are the inphase and quadrature terms respectively of the complex product of these two complex numbers. Means for mechanizing the above product terms are known in the art—such as those illustrated in copending application Ser. No. 73,470, filed Sept. 18, 1970, by Frederick C. Williams, entitled "Polyphase Encoding-Decoding System", and assigned to the assignee of the subject application.

The output signal from multiplier 122 is combined with the signal at the output of shift register 128 in a summation unit 130 and the resultant sum signal is normally applied through a switching circuit 132 to the input of shift register 128.

The shift register 128, sometimes hereinafter referred to as a serial data storage device, which may be 600 words in length, functions to store the partial sum for each of the 600 range cells as each range cell, for the azimuth block associated with the channel, is focused during a subarray time period. For each of the subblocks, such as block 29 of FIG. 3, the same focusing coefficient is applied to each input data burst. For the parameters presented above, the total time to fly 12 subarrays is 6 seconds, and the time of a single subarray is T/12=0.5 seconds. At an input data rate of 200 presumed video bursts per second, there are 100 data bursts, each containing 600 words (each word associated with a range resolution cell) for each subarray.

After range interpolation within unit 116, the data from one subarray is multiplied by a 100 constants (A) as a function of phase focusing from an azimuth point of view. To compensate for the depth of focus considerations the coefficients A also are a function of the range subblock being processed. Hence, the coefficients to multiplier 122 are designated $A_{b-f}$ where first subscript identifies the number of the presumed data burst, and the second subscript identifies the range subblock. For example, for the 100 bursts of data associated with any particular subarray these are 100 coefficients associated with the respective bursts sequences for the first range subblock; a new set of 100 coefficients associated with the second range subblock, etc., for a total of 600 focusing coefficients per subarray.

The 600 partial sums for each 60 foot azimuth block (each processing channel) are stored in shift register 128 and are circulated through the summation circuit 100 times during the formation of a subarray. These signals correspond to 3,000 feet of range coverage at 5 feet range resolution.

Figure 8:
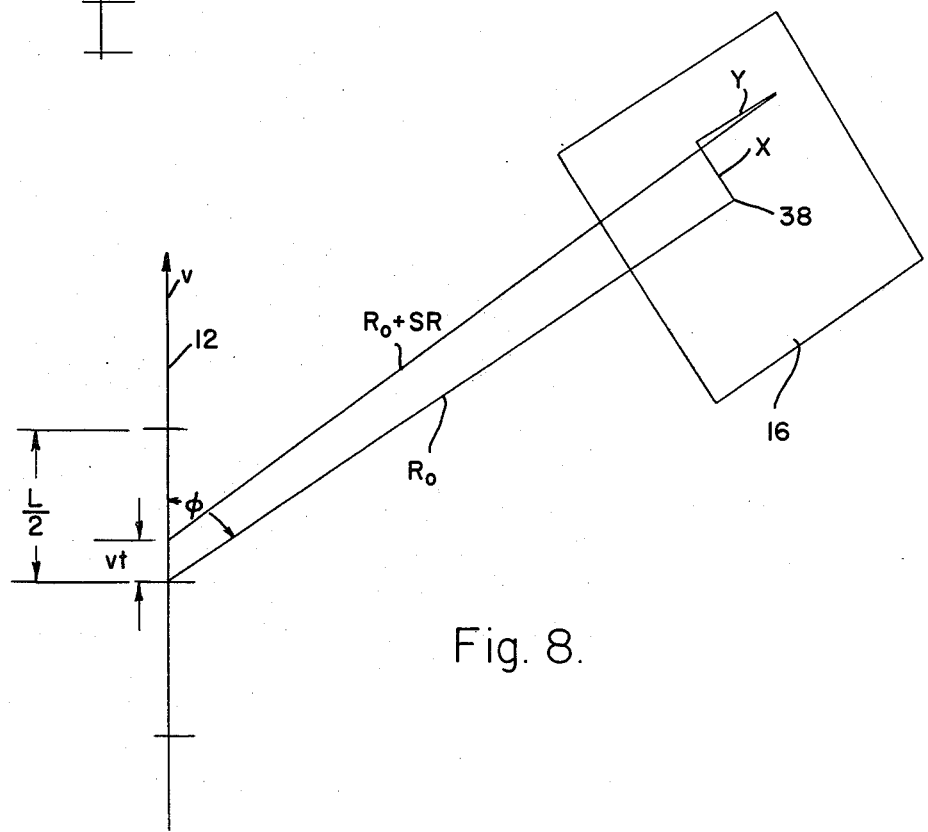
FIG. 8 is a diagram of flight path-terrain geometry useful for explaining the method of computing focusing coefficients for the processor of FIGS. 6 and 7.

With reference to FIG. 8, the difference ($\delta R$) between the distance from the center of the synthetic array to the center of the mapped area 16 ($R_o$, $\theta$), and the distance from the points vt along the synthetic array to a point located at a distance (x, y), away from the center of the area being mapped can be written to terms of the third order as:

$$\delta R \simeq \frac{1}{2R_o^2} \{2R_o^2 y + R_o X^2 - X^2 y - vt[2xR_o\sin\theta - X^2\cos\theta - 2xy\sin\theta] - v^2t^2[y\sin^2\theta + 2x\cos^2\theta]\} \quad (1)$$

The inphase and quadrature terms for multiplier coefficients A are Cos $\delta\phi$ and Sin $\delta\phi$, respectively; where $\delta\phi$ is equal to $4\pi\delta R/\lambda$. These multiplication values are computed for each ($R_o$, $\theta$) corresponding to the center of the synthetic array (at 6 second intervals); for each x value (the center of each azimuth block, 48 values); and y value, (each subblock in the range dimension, 6 values) for each presumed data burst (200 burst per second—600 words per burst). Programming computer 126 for this computation could include incrementing in x, y and t and double incrementing to obtain $x^2$ and $t^2$—techniques which are well known in the computer programming art.

At the end of the first subarray, the signals from summation circuit 130 are indicative of the low azimuth resolution map (60 foot resolution) for the azimuth block associated with a particular channel. Means for processing this data and the data generated during the subsequent subarrays, to form the high resolution map (see FIG. 1a) will now be considered. Again, referring primarily to FIG. 7, at the end of the first subarray (the 100th data burst for the selected parameters) switch 132 applies the output data from summation circuit 130 through a switch 134 to a shift register 136, instead of returning this data to shift register 128. At this time, at the end of a subarray, the low resolution map had been formed by the phase rotation and accumulation operations performed within multiplication unit 122, shift register 128 and summation circuit 130. This data is further processed and stored, and combined with data from subsequent subarrays to provide the high resolution map.

During the second subarray (the first filter processing time $P_1$ of FIG. 9c) the low azimuth resolution data formed during the first subarray and stored in the 600 stages (one for each range resolution element) of shift register 136 is circulated 12 times. During each circulation the proper multiplier values (B) are applied from a coefficient storage unit 138 to a complex multiplier unit 140. The output signals from multiplier 140 are used to digital frequency synthesis of the corresponding portions of the high azimuth resolution maps from the 12 sequentially formed low azimuth resolution maps. During each of the 12 recirculations of shift register 136, the proper phase rotation and amplitude weighting (complex multiplication by B) is applied to the data and it is then coupled through a summation unit 142 to a memory device 144.

The memory device 144 which may be of the random access memory type, has its addressing format programmed such that during the second subarray (first filter processing period $P_1$) 12 phase shifted values (multiplied by different B values) for each range resolution cell are stored within the memory. During the following subarray (filter processing period $P_2$) the twelve stored value for each of the resolution cells are sequentially retrieved from the memory and summed in summation circuit 142 with data from a corresponding resolution cell and circulation cycles to form first residue signals. These first residues, sometimes hereinafter referred to as partial sum signals, are then stored in memory 144 and during the following subarray time period (period $P_3$) are sequentially retrieved and combined with data from a corresponding resolution cell and circulation cycle from subarray 3 to form second residue signals.

The above just described process mechanizes by a Fourier Transform technique, the equivalent of a bank of equally spaced adjacent digital filters, which encompass the doppler frequencies defining the different cells (28 of FIG. 1a) for the high resolution map. For example, considering the first range resolution cell of a low resolution azimuth block such as block 26 (FIG. 1), if X (k) for k equal to 1, 2, 3, . . . N, is the value of the low resolution signal formed during each of the N subarray time periods then:

$$Y(i) = \sum_{k=1}^{N} X(k)g(k)e^{j2\pi ik/N} \quad (2)$$

is the value of the ith filter output signal, where i also is equal 1, 2, 3, ... N. $g(k)e^{j2\pi ik/N}$ is the B multiplication coefficient of multiplier 140 discussed above. The term $g(k)$ is an amplitude weighting function which may be included in each of the multiplication operations to obtain the desired response shape for the filter bank outputs. For example $g_k$ could be of a truncated gaussian shape centered at the center subarray data point.

Therefore, on the last twelve circulations of the data in register 136 following subarray number 12 (filter processing period $P_{12}$), output signals, indicative of the high azimuth resolution cells (28 of FIG. 1a), are formed in summation circuit 142. These signals may be stored in memory 144 as well as applied on an output lead 146 to display unit 114 (FIG. 6). For the selected parameters, there will be 12 output signals for each of the 600 range resolution cells for each of the processing channels. Hence, data defining 600×48 (channels)×12 individual resolution cells, each 5 feet by 5 feet are stored in the memory 144 and/or applied to the display unit 114. The multiplication coefficients applied to multiplier 140 from coefficient storage unit 138 could be precomputed and manually entered in unit 138 or preferably they may be computed by computer 126 in accordance with Equation (2). These B coefficients applied to multiplier 140 consists of 144 values (12 circulations of each of the 12 subarrays) for each of the 6 range subblocks and they are common to all 48 parallel processing channels.

OPERATION

To summarize the operation of the processor of FIG. 7, interpolator 116 is controlled by computer 126 ($\tau$ coefficients) so as to cause the centers of the resolution subblocks (FIG. 3) to lie on a straight line rather than along a cord of a circle of constant range. The line-by-line processing portion of each channel, such as units 122, 130, 132 and 128, form a low azimuth resolution map for each of the 600 range cells of the associated low azimuth resolution block. The digital frequency synthesis portion of the processor channel shown in FIG. 7, such as unit 134, 136, 140, 142 and 144, respond to the data from corresponding parts of the low azimuth resolution maps formed during each of the subarrays to provide a high resolution map.

The timing sequence of the operation of processor 100 will now be explained by outlining the steps in the formation of one high resolution map. The multiplier coefficients applied to complex multiplier unit 122 are expressed as $A_{b-f}$ where the first subscript identifies the data burst number (1 through 1200) and the second subscript the range subblock, sometimes hereinafter referred to as a range subgroup (1 through 6). The received data from interpolator 116 is designated $x_{b-r}$ where the first subscript is the burst number and the second subscript corresponds to the range cell (1 through 600). The data pulses of the first burst (600 range gated returns from the first transmission period) are focused and amplitude weighted within multiplier 122, and the output signals therefrom may be written in a time sequence as:

$$A_{1\text{-}1} x_{1\text{-}1}, A_{1\text{-}1} x_{1\text{-}2} \ldots A_{1\text{-}1} x_{1\text{-}100}, A_{1\text{-}2} x_{1\text{-}101} \ldots$$
$$A_{1\text{-}6} x_{1\text{-}600} \quad (3)$$

It is noted that every 100 range intervals the value of the multiplier coefficients are changed to correct for the depth of focus effects discussed previously. This sequence of signals is applied from multiplier 122 by means of switch 132 to shift register 128. On the second input data burst, multiplier 122 provides output signals:

$$A_{2\text{-}1} x_{2\text{-}1}, A_{2\text{-}1} x_{2\text{-}2} \ldots A_{2\text{-}1} x_{2\text{-}100}, A_{2\text{-}2} x_{2\text{-}101} \ldots$$
$$A_{2\text{-}6} x_{2\text{-}600} \quad (4)$$

These signals are combined in summation circuit 130 with the signals stored in shift registers 128 and the sum thereof are applied through switch 132 to shift register 128. At the end of the second data burst the signals stored in shift register 128 are:

$$A_{1-1}x_{1-1}, \; A_{1-1}x_{1-2} \; \ldots \; A_{1-1}x_{1-100}, \; A_{1-2}x_{1-101} \; \ldots \; A_{1-6}x_{1-600} \quad (5)$$
$$+, \quad + \quad \ldots \quad +, \quad + \quad , \quad +$$
$$A_{2-1}x_{2-1}, \; A_{2-1}x_{2-2} \; \ldots \; A_{2-1}x_{2-100}, \; A_{2-2}x_{2-101} \; , \; A_{2-6}x_{2-600}$$

On the 100th burst, the output of multiplier 122 is a sequence of signals:

$$A_{100\text{-}1} x_{100\text{-}1}, A_{100\text{-}1} x_{100\text{-}2}, \ldots A_{100\text{-}1} x_{100\text{-}100},$$
$$A_{100\text{-}2} x_{100\text{-}101} \ldots A_{100\text{-}6} x_{100\text{-}600} \quad (6)$$

and the output of summation circuit 130 on burst 100 is:

$$X_{1\text{-}1}, X_{1\text{-}2} \ldots X_{1\text{-}100}, X_{1\text{-}101} \ldots X_{1\text{-}600} \quad (7)$$

where the first subscript of the "X" define the subarray; the second subscript the associated range cell and the notation $$X_{1-r} = \sum_{b=1}^{100} A_{b-f} x_{b-r}.$$

For example, the output signal $X_{1\text{-}1}$ from summation circuit 130 on the first processing period (range cell) of the 100 burst is:

$$A_{1\text{-}1} x_{1\text{-}1} + A_{2\text{-}1} x_{2\text{-}1} + A_{3\text{-}1} x_{3\text{-}1} + \ldots A_{100\text{-}1} x_{100\text{-}1} \quad (8)$$

On the 100th burst which is the end of the first subarray time period, switch 132 is operated to cause the data from the summation circuit 130 to be shifted into shift register 136 instead of into shift register 128. Hence, during the 100th burst, shift register 128 is emptied.

In a similar manner, on burst 101 the output signals from multiplier 122 are:

$$A_{101\text{-}1} x_{101\text{-}1}, A_{101\text{-}1} x_{101\text{-}2}, \ldots A_{101\text{-}1} x_{101\text{-}100},$$
$$A_{101\text{-}2} x_{101\text{-}101}, \ldots A_{101\text{-}6} x_{101\text{-}600}; \quad (9)$$

and as described for the first subarray, the partial sum of the focused data for each range cell is accumulated during the second subarray such that on the 200 burst the output of summation circuit 130 is:

$$X_{2-1}, X_{2-2} \ldots X_{2-100}, X_{2-101} \ldots X_{2-600} \qquad (10)$$

Also on the 200th burst which is the end of the second subarray time period, switch 132 is operated to cause the data at the output of summation circuit 130 to be shifted into shift register 136 instead of into shift register 128.

This just described operation is repeated for every successive subarray such that on burst 1200 the output signals from summation circuit 130 are:

$$X_{12-1}, X_{12-2} \ldots X_{12-100}, X_{12-101} \ldots X_{12-600} \qquad (11)$$

Reference is now directed to the digital frequency synthesis portion (units 134, 136, 138, 140, 142 and 144) of the processor channel shown in FIG. 7. The following description explaining how effectively 12 filters are formed for each of the 600 range intervals. On burst 100 the signals $X_{1-r}$ are shifted into shift register 136 and during burst 101 through 199 (filter processinng time $P_1$) these signals are recirculated 12 times in the loop which includes switch 134 and register 136. The signals stored in the register 136 represent the value of the resolution cells (600 range intervals) for the low azimuth resolution map formed during the last preceding subarray. During each circulation of this data it is multiplied in multiplier 140 by a different coefficient (B) as defined by Equation 2. Due to changes in the doppler frequency differential across a low azimuth block (26) as a function of range, it may be desirable to adjust the g(k) weighting function to optimize coverage of the synthesized filter bank each range subblock. Hence the B coefficients may be varied as a function of the range subblock, however, to clarify the explanation, this variable (B as a function of R) is ignored in the following analysis. During the first circulation of the data, the terms:

$$B_{1-1} X_{1-1}, B_{1-1} X_{1-2} \ldots B_{1-1} X_{1-600} \qquad (12)$$

are formed and stored in memory 144. The first subscript of the coefficient B identifies the subarray number; and the second subscript identifies the filter number (also the circulation cycle). On the second circulation of the data ($X_1$) formed during the first subarray, the terms:

$$B_{1-2} X_{1-1}, B_{1-2} X_{1-2} \ldots B_{1-2} X_{1-600} \qquad (13)$$

are formed and stored in the memory 144. This process continues until the 12th circulation wherein terms:

$$B_{1-12} X_{1-1}, B_{1-12} X_{1-2} \ldots B_{1-12} X_{1-600} \qquad (14)$$

are formed and stored in memory 144.

on burst 200, switch 134 opens the "feedback" loop 135 around shift register 136. During burst 200, the old data (from the first subarray) is "dumped" and new data from the second subarray: $X_{2-1}, X_{2-2} \ldots X_{2-600}$, is shifted into register 136 through switches 132 and 134. During burst 201 through 299 (filter processing time $P_2$), the new data associated with subarray number 2 is circulated 12 times in a manner similar to that explained above for subarray number 1. However, now the data corresponding to each filter (circulation cycles), for each range bit, that was stored in memory 144 during the last filter processing period is recalled from memory 144 during the appropriate cycles such that the partial sums required to produce the effect of 12 filters may be accumulated. For example, during the first circulation of period $P_2$ the terms $$\begin{array}{cccc} B_{1-1}X_{1-1} & B_{1-1}X_{1-2} & \ldots & B_{1-1}X_{1-600} \\ +, & +, & & + \\ B_{2-1}X_{2-1} & B_{2-1}X_{2-2} & \ldots & B_{2-1}X_{2-600} \end{array} \qquad (15)$$

are formed and stored in memory 144. Considering the first term of Equation (15), the quantity $B_{1-1} X_{1-1}$ was formed during the processing period $P_1$ and was recalled from memory after the term $B_{2-1} X_{2-1}$ were formed by multiplier 140 during the first processing step of the first cycle of period $P_2$. In a similar manner the terms for each range cell of the data for circulation 1 are formed as indicated by Equation (15) and similar type series of terms are formed during circulations 2 through 12. During circulation 12 the following sequence of terms would be stored in memory 144:

$$\begin{array}{cccc} B_{1-12}X_{1-1} & B_{1-12}X_{1-2} & \ldots & B_{1-12}X_{1-600} \\ +, & +, & & + \\ B_{2-12}X_{2-1} & B_{2-12}X_{2-2} & & B_{2-12}X_{2-600} \end{array} \qquad (16)$$

Twelve partial sums for each of the 600 range cells are formed during each filter processing time period in the same manner as just outlined. For example, during the time period of burst 1201 to 1299 (filter processing period $P_{12}$), on the first circulation of register 136, the terms:

$$Y_{1-1}, Y_{1-2}, Y_{1-2} \ldots Y_{1-600} \qquad (17)$$

are stored in memory 144. The term $Y_{1-1}$ would be the completed output signal for the first filter of the first range cell in accordance with Equation (2), and represents the value of one high resolution cell (5 feet resolution in range and azimuth) of the completed map. The term $Y_{1-2}$ would represent the value associated with the first filter of the second range cell and so forth for the remaining range cells, with the term $Y_{1-600}$ being the value for the first azimuth high resolution cell and the range cell 600. In a like manner during subsequent circulations the high resolution map is completed term by term with the last series of term $$Y_{12-1}, Y_{12-2}, Y_{12-3} \ldots Y_{12-600} \qquad (18)$$

completing the map. The term $Y_{12-1}$ is the value of the 12th filter (azimuth resolution cell) for the first range cell.

Thus there has been described a new and efficient method and apparatus for processing radar data to provide high resolution synthetic array data in a format readily adapted for display.

We claim:

1. A system for processing radar data received from a selected area of a surface illuminated by a radar beam during a plurality of subarray flight path segments so as to produce high resolution synthetic array data, said system comprising:

first processor means for adjusting the relative time delay and phase of the radar data received during each subarray flight path segment and for summing the resultant signals associated with the same resolution cell in said area to consecutively provide sets of imagery data, with each set corresponding to the same group of substantially rectangularly oriented resolution cells but derived from radar data from different subarray flight path segments; and second processor means for filter processing the data of corresponding resolution cells from each of said sets of imagery data to produce a subset of high resolution synthetic array imagery data for each resolution cell, with each subset corresponding to a plurality of resolution elements.

2. The processor of claim 1 wherein said selected group of resolution cells has columns of resolution cells approximately parallel to a first axis and rolls of resolution cells approximately parallel to a second substantially orthogonal axis, and said first processor means includes a plurality of first parallel processing channels equal in number to the number of said columns, with each channel providing the imagery data for a different one of said columns and including:

delay means for delaying the received radar data as a function of the subarray flight path segment of the radar data being processed;

first multiplier means coupled to said delay means for phase and amplitude adjusting the output signals therefrom as a function of the motion along said flight path of the source of said radar beam; thereby electronically focusing the received radar data at the approximate center of the associated column; and accumulator-circulator means for sequentially forming from the data of each subarray flight path segment the sum of the phase-amplitude adjusted data for each cell in the associated column, to provide said imagery data for the resolution cells of said associated column.

3. The processor of claim 2 wherein said second processor means includes a plurality of second parallel processing channels with each second parallel processing channel coupled to a different one of said first parallel processing channels and including:

second multiplier means coupled to the accumulator-circulator means of the associated first parallel processing channel for multiplying the applied imagery data for the resolution cells of the associated column by a plurality of complex coefficients to produce a plurality of product signals; and means for summing selected groups of said product signals associated with all of the subarrays, to provide said subset of high resolution synthetic array imagery data for each resolution cell.

4. The processor of claim 3 wherein said second multiplier means includes means for circulating the imagery data for the associated column of resolution cells from each subarray flight path segment a number of times equal to the number of subarray flight path segments, and means for multiplying said data during each circulation by a different complex coefficient.

5. The processor of claim 4 wherein said means for summing the product signals includes means for forming and storing partial sum signals during each circulation cycle, and means for updating these stored partial sum signals as a function of the associated product signal for the same resolution cell formed during the next circulation cycle.

6. The system of claim 1 further comprising compensation means for adjusting the frequency of the radar data so as to maintain the frequency of the data received from the central portion of the illuminating beam substantially constant.

7. The system of claim 2 wherein a plurality of range sweeps of data are sequentially received each subarray flight path segment, with each range sweep having a plurality of range zones and each range zone being associated with a different one of said rolls of resolution cells, and wherein selected groups of adjacent rolls of resolution cells define depth of focus range subgroups and said first multiplier means includes multiplier coefficient control means for varying the phase and amplitude adjustments as a function of the range sweep and range subgroup to cause the center of said range subgroups to be approximately linearly disposed along said second axis.

8. The system of claim 7 wherein said accumulator-circulation means includes:

a summation unit having a first input circuit coupled to the output of said first multiplier means, a second input circuit and an output circuit;

first switching means having an input circuit coupled to the output circuit of said summation unit and having first and second output circuits, for coupling its input circuit to its first output circuit during the processing of each of said range sweeps except the last range sweep of each subarray, and for coupling its input circuit to its second output circuit during the processing of said last range sweep of each subarray;

a first serial data storage device having an input circuit coupled to the first output circuit of said first switching means, and an output circuit coupled to said second input circuit of said summation unit; and means for coupling said second output circuit of said first switching means to said second processor means; whereby the set of imaging data of the associated channel for each subarray flight path segment is accumulated in the loop including said summation unit, said first switching means and the first serial data storage device, and the set of imagery data is then coupled through the second output circuit of said first switching means to said second processor means.

9. The system of claim 8 wherein said second processor means includes a second switching means having a first input circuit coupled to the second output circuit of said first switching means a second input circuit and an output circuit, for coupling its first input circuit to its output circuit during the time period data is applied to said second output circuit of said first switching means and for coupling its second input circuit to its output circuit during other time periods;

a second data serial storage device having an input circuit coupled to the output of said second switching means and having an output circuit coupled to said second input circuit of said second switching means;

control means coupled to said second data serial storage device for causing the data applied from said first switching means to be circulated through said second data serial storage device a number of times equal to the number of subarrays;

second multiplier means for multiplying the output signal of said second storage device during each circulation by a different complex coefficient;

a second summation unit having a first input circuit coupled to said second multiplier means, a second input circuit and an output circuit; and storage means having an input circuit coupled to the output of said second summation unit, a first output circuit coupled to said second input of said second summation unit and a second output; whereby a plurality of partial sum signals associated with each resolution cell-complex coefficient combination is stored by said storge means during each circulation cycle and then updated as a function of the signal of the corresponding combination provided by said second multiplication means during the next circulation period.

10. The system of claim 9 furthe comprising a display device coupled to said second output circuit of said storage means.

11. A system for producing high resolution synthetic array data comprising:

radar means for transmitting and receiving energy to provide radar data during N subarray flight path segments;

first processor means for providing N consecutive sets of imagery data from said radar data, with each set of imagery data corresponding to the same group of columns of resolution cells along a first axis and rolls of resolution cells along a second axis; said first processor means comprising a plurality of first parallel processing channels with each processing channel providing imagery data associated with a different one of said columns and including delay means for delaying the received radar data as a function of the subarray flight path segment associated therewith to cause said rolls of resolution cells to be substantially parallel; and focusing means for adjusting the phase of the received time delayed data and for summing the resultant phase adjusted signals associated with the same resolution cell to form said imagery data for the resolution cells of the associated column; and second processor means for filtering the data for corresponding resolution cells from each of said N sets of imagery data to produce a subset of high resolution synthetic array imagery data for each resolution cell, with each subset corresponding to a plurality of resolution elements.

12. The system of claim 11 wherein said second processor means includes a plurality of second parallel processing channels with each said second processing channel coupled to an associated one of said first parallel processing channels and including:

first multiplication means for multiplying the imagery data by N complex coefficients to provide product signals; and means for summing selected groups of said product signals derived from the data from each of said N subarrays to provide said subset of high resolution synthetic imagery data for each resolution cell.

13. The system of claim 11 wherein said focusing means includes:

second multiplication means coupled to said delay means for phase and amplitude adjusting the time delayed radar data as a function of the motion along said flight path of said radar means; and accumulator-circulator means for sequentially forming from the data from each subarray flight path segment, the sum of the phase-amplitude adjusted data corresponding to each resolution cell in the associated column to provide said imagery data for the resolution cells of said associated column.

14. The system of claim 12 wherein said first multiplier means includes means for circulating the imagery data for the associated column of resolution cells N times, and means for multiplying said data during each circulation by a different complex coefficient.

15. The system of claim 12 wherein said means for summing the product signals includes means for forming and storing partial sum signals formed during each circulation cycle, and means for updating the stored partial sum signals as a function of the associated product signal for the same resolution cell formed during the next circulation cycle.

16. The system of claim 11 further comprising means for adjusting the frequency of the received radar data to maintain the frequency of the radar data from the central portion of the radar beam substantially constant.

17. The method of producing high resolution synthetic array data comprising the steps of:

transmitting and receiving energy to provide radar data during N subarray flight path segments;

adjusting the relative phase and time delay of the radar data received during each subarray flight path segment, and summing the resultant signals associated with the same resolution cell to provide N consecutive sets of imagery data with each set corresponding to the same group of substantially rectangularly oriented resolution cells but different subarray flight path segments; and filtering the data of corresponding resolution cells from each of said N sets of imagery data to produce a subset of high resolution synthetic array imagery data for each resolution cell.

18. The method of claim 17 wherein said group of resolution cells comprises approximately parallel columns of resolution cells along a first axis and approximately parallel rolls of resolution cells along a second orthogonal axis, and said step of adjusting the relative phase and time delay of the radar data and for summing the resultant signals includes the step of:

delaying the received radar data as a function of the subarray flight path segment associated therewith;

multiplying the delayed received data by complex coefficients to adjust the phase and amplitude thereof as a function of motion along said flight path; and forming from the data from each subarray flight path segment the sum of the phase-amplitude adjusted data corresponding to each cell to provide one set of said imagery data for each subarray segment.

19. The method of claim 17 wherein said step of filtering the data of corresponding resolution cells from each of said N sets of imagery data inclues multiplying the imagery data for each of the resolution cells by a plurality of complex coefficients to provide product signals; and summing selected groups of said product signals derived from the data from each of said plurality of subarrays, to provide said subset of high resolution synthetic array imagery data for each resolution cell.

20. The method of claim 19 wherein said step of multiplying the imagery data by a plurality of complex coefficients includes the steps of circulating the imagery data resulting from each subarray flight path segment N times and multiplying said data during each circulation by a different one of said complex coefficients.

21. The method of claim 19 wherein said step of summing the product signals includes forming and storing partial sum signals during each circulation cycle, and updating each stored partial sum signal as a function of the associated product signal for the same resolution cell formed during the next circulation cycle.

* * * * *